UNITED STATES PATENT OFFICE.

WILLIAM O. KAISER AND GEORGE F. STROEBEL, OF BURLINGTON, IOWA.

BEVERAGE AND METHOD OF PREPARING SAME.

1,146,171. Specification of Letters Patent. Patented July 13, 1915.

No Drawing. Application filed August 12, 1914. Serial No. 856,495.

*To all whom it may concern:*

Be it known that we, WILLIAM O. KAISER and GEORGE F. STROEBEL, citizens of the United States, residing at Burlington, in the county of Des Moines and State of Iowa, have invented certain new and useful Improvements in Beverages and Methods of Preparing Same; and we hereby declare that the following is a full, clear, and exact description thereof.

This invention is a novel non-alcoholic medicinal beverage composed of a liquid "base" made from fermented malt, cereal and hops, but having the alcohol resulting from the fermentation expellel by heat, and the resulting non-alcoholic liquid containing all the valuable constituents of a heavy beer, medicated with proper medicinal agents. This beverage we call "Iromalt" and contains approximately only about fifty-one-hundredths-of-one-per cent. of alcohol, and may therefore be properly termed non-alcoholic.

The "base" for one barrel (310 bottles) of the beverage may be made on the following formula:—barley malt 40 lbs., rice 18 lbs., dextrin 5½ lbs., hops ¼ lb., water 31 gals., yeast enough to cause fermentation about two pounds. This produces one barrel (31 gallons) of the above "base" containing about 9% of dissolved solids. The "base" may be medicated by various medicinal agents preferably added to it when cold, and the whole is afterward filtered to produce a clear beverage or fluid.

The following formula gives one example of the medicaments which may be used for one barrel of the beverage: iron pyrophosphate (soluble) grains 165, iron peptonized grains 165, calcium lacto-phosphate grains 83, citric acid grains 990. These medicaments are first dissolved in water and then added to one barrel (or 330 bottles) of the "base". The amount of medicaments in one bottle of the beverage is about the average dose of these tonics usually prescribed by physicians. Small doses of these remedies, often repeated give the best results. The formula furnishes about 1 grain of the combined iron compounds, ¼ grain calcium lacto-phosphate and 3 grains citric acid per bottle. One bottle being a dose. The medicaments are added for their tonic properties and food value, principally.

The "base" may be practically prepared as follows, when manufacturing the beverage in quantities:—Ground malt is mashed or infused with water (in the proportion of 100 lbs. malt to one barrel of water,) (31 gal.) at 30° Reaumer and "peptonized" one hour. By peptonized we refer to the known fact that malt contains an enzyme called "peptase" which at certain temperatures will act upon albuminoids, changing them into soluble albumins, peptones and amids. The two latter especially being soluble in the finished product. Holding the wort at 30° R. insures this action of the peptase on the albuminoids thereby changing them into the soluble peptones and amids which increases the food value of our product. At this temperature (30° R.) the diastase is inactive. Wort treated in this manner is said to be "peptonized". In another vessel containing water is placed 75 lbs. ground cereal such as rice, together with 10% of ground malt to each barrel of water; then the mixture is peptonized for 25 minutes at 30° R. and then raised to the boiling point and boiled 50 minutes. The lautermash or malt mash liquid is now drained off from the ground malt, added to the raw cereal mash and boiled for 15 minutes. This boiling destroys the action of the diastase. The combined mixture is then transferred to the malt mash tub, containing the residue of the ground malt, and the temperature raised to 62½° R. in five minutes, at which temperature the diastase yet remaining in the malt mash saccharifies all the starch. Raising the temperature to 62½° R. in five minutes converts the starch of the cereal wort into dextrin (unfermentable sugar) instead of into maltose, a fermentable sugar, which would occur if the raise of temperature extended over a considerable length of time. After settling the wort is then pumped through a small tank containing the dextrin (5½ lbs. per barrel) which it takes up, the wort being kept at 62½° R. until the transfer is completed. The combined worts are now cooled to 12° R. and 2 lbs. yeast per barrel added, allowed to ferment 1% of the whole extract which requires eight to nine hours. The entire wort is now transferred to a kettle, raised to the boiling point and boiled for five hours. This boiling after fermentation is especially desired, for the reason that a large percentage of the albuminoids (amids) contained in the wort are absorbed by the growing yeast cells, together with considerable quantities of mineral salts (potassium phosphate etc.)

On boiling for five hours after the end of the fermentation period, the yeast cells are ruptured and their entire contents dissolved in the wort, which also changes the entire character of the solution and adds further to its food value. This boiling also removes the alcohol. One-eighth of a pound of hops per barrel is now added, and the boiling continued fifty minutes after which one-eighth pound more of hops per barrel is added and boiling continued ten minutes more, after which water is added in sufficient quantity to bring the mixture up to its original volume. The product is then cooled to 1° R. and kept at this temperature for twenty-four hours. It is then cooled to the freezing point, carbonated and filtered. The medicinal agents are then added, in solution, (in the quantities given in the above formula,) and the product aged from four to six weeks in the cold, then filtered, carbonated again, and bottled. The resultant product is a non-alcoholic beverage, medicated as desired, the medicaments above mentioned being given merely as an example, and the invention is not restricted to the particular medicaments used, and the "base" might be used as a beverage without being medicated; but the medicaments enhance its nutritive and medicinal values, and also enhance the flavor and palatability of the beverage.

The combination of iron and calcium with the phosphoric acid in the beverage render them of great value in cases of anemia and nerve depletion. Combined with the food values of the base the beverage is an excellent tonic of great hygienic value.

What we claim is:

1. A non-alcoholic base made by fermenting a mixture of malt, rice, dextrin and hops, and expelling the alcohol resulting from fermentation by heat.

2. A base for a non-alcoholic beverage produced by fermenting an extract of malt, cereals and hops, and boiling the mixture after fermentation to rupture the yeast cells and dissolve their contents in the wort.

3. A base for a non-alcoholic beverage produced by fermenting an extract of malt, cereals and hops, and boiling the mixture after fermentation to rupture the yeast cells and dissolve their contents in the wort and to expel the alcohol resulting from the fermentation of the mixture, and cooling the resultant non-alcoholic liquid, substantially as specified.

4. The herein described process of producing a non-alcoholic beverage consisting in fermenting a mixture of malt, cereals and hops, and boiling the mixture after fermentation to rupture the yeast cells and dissolve their contents in the wort.

5. The herein described process of producing a non-alcoholic beverage consisting in fermenting a mixture of malt, cereals and hops, and boiling the mixture after fermentation to rupture the yeast cells and dissolve their contents in the wort and expel the alcohol resulting from the fermentation of the mixture, and cooling the resultant non-alcoholic liquid, substantially as specified.

6. The herein described method of preparing a non-alcoholic base, consisting in preparing a peptonized infusion of malt, preparing a raw cereal mash, adding the wort or malt mash liquid to the raw cereal mash and boiling the same, adding the combined mixture to the residue of the ground malt and raising the temperature of same to saccharify the starch and convert same into dextrin; then permitting the mixture to settle and adding dextrin to the wort, then fermenting the mixture, and finally boiling the same until the yeast cells are ruptured and their contents dissolved.

7. The herein described method of preparing a non-alcoholic base, consisting in preparing a peptonized infusion of malt, preparing a raw cereal mash, adding the wort or malt mash liquid to the raw cereal mash and boiling the same, adding the combined mixture to the residue of the ground malt and raising the temperature of same to saccharify the starch and convert same into dextrin; then permitting the mixture to settle and adding dextrin to the wort, then fermenting the mixture, then boiling the same until the yeast cells are ruptured and their contents dissolved such boiling also removing the alcohol; then adding hops and continuing the boiling, and finally cooling the mixture, substantially as described.

8. A beverage comprising a non-alcoholic liquid extract of malt, cereals and hops, in which the yeast cells have been ruptured by heat, substantially as described.

9. A non-alcoholic beverage composed of a liquid extract of malt, cereals and hops, from which the alcohol has been expelled and the tannin precipitated by heat.

10. A beverage comprising a non-alcoholic liquid produced by making a liquid extract of malt, cereals and hops and heating same to rupture the yeast cells precipitate the tannin and expel the alcohol, substantially as described.

11. The process of producing a non-alcoholic beverage consisting in making a liquid extract of malt, cereals, and hops, and heating same to rupture the yeast cells precipitate the tannin and expel the alcohol, substantially as described.

12. The herein described process of producing a non-alcoholic beverage consisting in extracting malt, cereals and hops, heating same to rupture the yeast cell and expel the alcohol, and cooling the resultant non-alcoholic liquid, substantially as specified.

In testimony that we claim the foregoing as our own, we affix our signatures in presence of two witnesses.

WILLIAM O. KAISER.
GEORGE F. STROEBEL.

Witnesses:
HENRY A. PLITT,
ANNA M. KAISER.